United States Patent [19]

Danner

[11] Patent Number: 4,763,865

[45] Date of Patent: Aug. 16, 1988

[54] FOLDABLE KEYBOARD STAND

[76] Inventor: Robert W. Danner, 4225 Connie Dr., Sterling Heights, Mich. 48310

[21] Appl. No.: 80,814

[22] Filed: Aug. 3, 1987

[51] Int. Cl.⁴ .................... G10G 5/00; A47B 43/00
[52] U.S. Cl. .................... 248/164; 248/127; 248/166; 248/173; 108/99; 108/118; 211/200; 182/154
[58] Field of Search ............... 248/164, 431, 432, 172, 248/173, 166, 440, 435, 436, 127, 150, 188.6, 165, 157, 188, 359.1; 108/118, 145, 99, 100; 403/242, 244, 271; 211/200, 201; 182/154; 297/186

[56] References Cited

U.S. PATENT DOCUMENTS

| | | | |
|---|---|---|---|
| 137,960 | 4/1873 | Rearden | 211/200 |
| 383,533 | 5/1888 | Ludwig | 211/200 X |
| 688,623 | 12/1901 | Forry | 248/164 |
| 748,387 | 12/1903 | Lilly | 248/436 X |
| 930,394 | 8/1909 | Bourgeois | 248/164 |
| 1,565,464 | 12/1925 | Kay | 248/127 X |
| 1,841,412 | 1/1932 | Leicht | 248/127 X |
| 2,802,578 | 8/1957 | Barile | 248/164 X |
| 2,919,092 | 12/1959 | Chasar et al. | 248/432 |
| 3,906,848 | 9/1975 | Gow | 248/432 X |
| 3,984,074 | 10/1976 | Forman et al. | 248/166 X |
| 4,321,874 | 3/1982 | Cenna, III | 248/164 X |
| 4,507,844 | 4/1985 | Renaud | 403/242 X |

FOREIGN PATENT DOCUMENTS

| | | | |
|---|---|---|---|
| 2144454 | 3/1973 | Fed. Rep. of Germany | 248/164 |
| 214591 | 7/1941 | Switzerland | 211/200 |

Primary Examiner—Alvin C. Chin-Shue
Attorney, Agent, or Firm—Cullen, Sloman, Cantor, Grauer, Scott and Rutherford

[57] ABSTRACT

A foldable keyboard stand is formed of a pair of elongated leg tubes that are pivotally connected together to form an X-shape which is arranged in an upright position. Horizontally arranged, parallel tubes are secured to the upper and lower ends of the leg tubes to form upper support and lower foot tubes. The support and foot tubes are arranged off-center relative to the axis of the leg tubes so that they extend forwardly, towards a user location, a considerably greater distance than they extend rearwardly. A resilient, foam plastic sleeve is placed upon and substantially covers each of the upper, support tubes opposite extension portions. A resilient, ring-like collar, which is higher than the support upper surfaces, are positioned upon the opposite ends of the support tubes so that a generally flat keyboard may be rested upon the sleeve covered support tubes and laterally restrained between the end collars. An adjustable length brace interconnects the leg tubes so that the angularity of the leg tubes can be adjusted by selectively adjusting the length of the brace for raising and lowering the support tubes in order to locate the keyboard in pre-selected user standing and sitting positions.

3 Claims, 1 Drawing Sheet

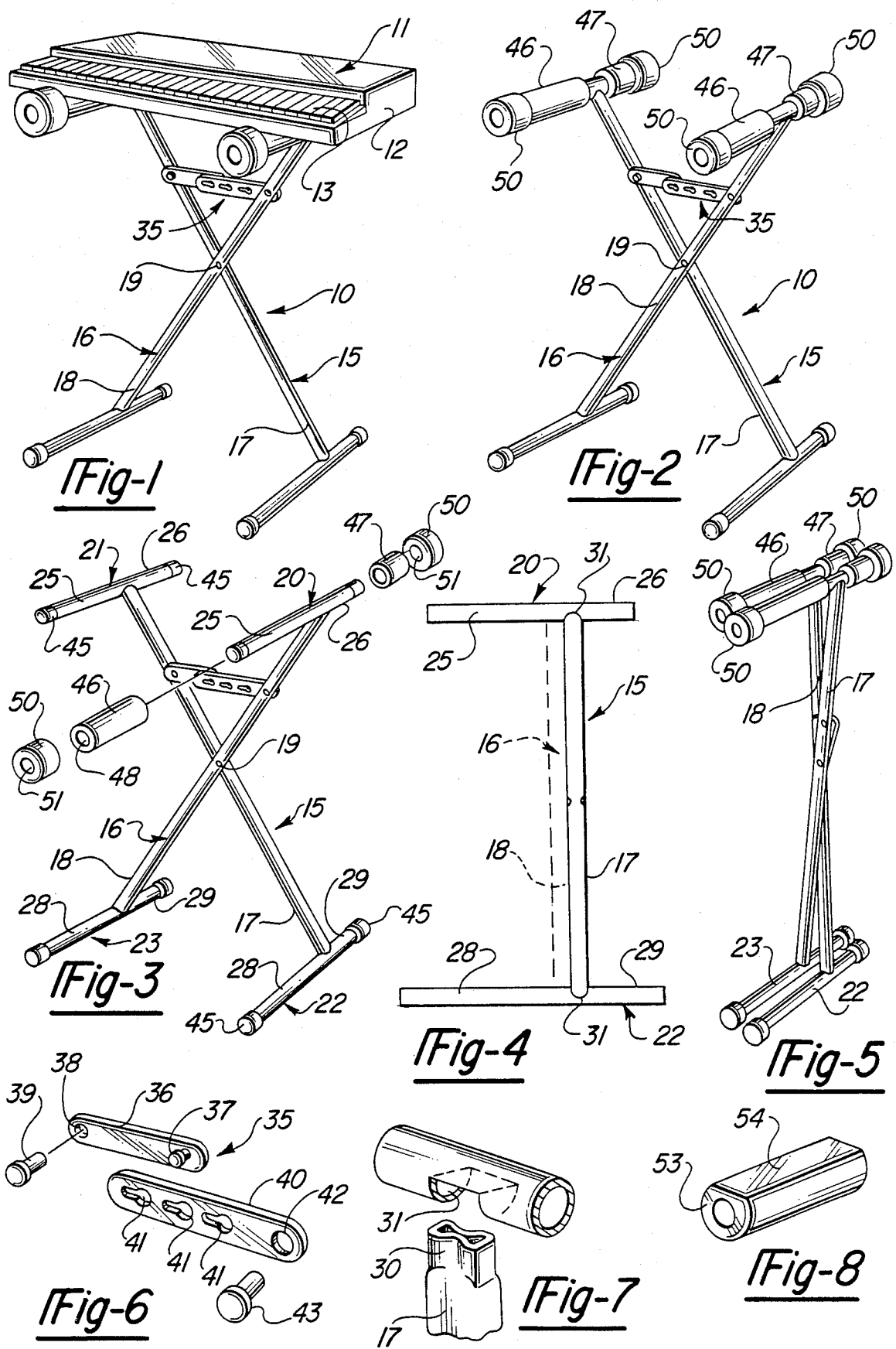

FOLDABLE KEYBOARD STAND

BACKGROUND OF INVENTION

This invention relates to an improved stand for supporting electronic piano type keyboard boxes, commonly referred to as keyboards, in different vertical positions to facilitate the user operating the keyboard from either a standing or sitting position.

In general, an electronic instrument type of keyboard comprises a relatively long, narrow and low box-like configuration. The keyboards are portable and generally, are moved about from place to place for use at different places or for storage. Thus, a suitable, lightweight, portable and foldable stand is needed to support the keyboard when desired. Different stand constructions have been made available in the past, but generally, these are relatively expensive, complicated or cumbersome in construction. Thus, there has been a need for a relatively lightweight, simply constructed stand which is inexpensive in construction so that it is readily available, particularly for use by the amateur musician whose keyboard investment is relatively low. That is, professional musicians, having expensive and relatively heavy keyboards, may require correspondingly heavy and rugged stands. The improved stand of this invention is directed towards the relatively lightweight, amateur used keyboard support function.

One type of prior keyboard support stand has been formed of two H-shaped units, with elongated center bars pivotally connected together and arranged in an upright position. Thus, the legs of the H-shaped, being horizontally arranged, act as upper supports upon which a keyboard may be rested, and lower feet which engage the ground. That type of support stand may be folded to place the two upright legs closely adjacent, or alternatively the legs may be spread apart at different angles for providing the desired height location of the keyboard. Straps, which interconnect the upper supports and the lower feet have been used to set the distances between the respective supports or feet and consequently, the resulting height of the supported keyboard. Thus, this present invention relates to improvements to the foregoing type of stand which provide a very inexpensive, lightweight, stand construction which better locates and supports a typical keyboard.

SUMMARY OF INVENTION

The invention herein contemplates a foldable keyboard stand which is formed of a pair of elongated leg tubes which are pivotally connected together at their center to form an X-shape which is located in a generally vertical plane or position. Parallel, horizontal support tubes and foot tubes are secured to the upper and lower ends respectively of the leg tubes. These support tubes and foot tubes are longitudinally off-set relatively to the leg tubes so that they extend forwardly, towards the user, a considerably greater distance than they extend rearwardly away from the user. For example, they may extend about twice the distance toward the user as the distance away from the user. In addition, the foot tubes may be longer than the support tubes and extend forwardly even further than the support tubes for stabilizing the upright arrangement of the stand.

Resilient, foam plastic sleeves are positioned upon the forwardly extending portions and the rearwardly extending portions of the support tubes and enlarged collars of similar material are arranged upon the ends of the support tubes. Thus, a keyboard may be resiliently supported upon the sleeve covered support tubes and restrained against lateral movement by the resilient collars.

An adjustable length, rigid brace interconnects the two elongated leg tubes at a distance above the pivot so that by manually adjusting the length of the brace, the relative angularity of the leg tubes may be adjusted for raising and lowering the height of the supported keyboard. A single brace, having several pre-selected adjustment positions, provides a sitting, standing and intermediate (e.g., for a stool) position for the user of the keyboard.

An object of this invention is to enable the stand to be made of relatively small diameter, lightweight, inexpensive metal tubing but which will adequately support a typical keyboard firmly and will resist tipping despite its lightweight construction, but which may be easily folded for storage and easily adjustable in height.

Another object of this invention is to provide a keyboard support stand with resilient support surfaces which frictionally engage and hold the keyboard against lateral or endwise movement and simultaneously, tend to absorb and reduce impact or other forces from the keyboard to the stand.

These and other objects and advantages of this invention will become apart upon reading the following description, of which the attached drawings form a part.

DESCRIPTION OF DRAWINGS

FIG. 1 is a perspective view showing the keyboard stand supporting a typical piano-type electronic keyboard.

FIG. 2 is a perspective view, similar to FIG. 1, but showing the stand without the keyboard.

FIG. 3 is a perspective view showing the keyboard stand with the resilient support sleeves and collars removed.

FIG. 4 is a side elevational view of one of the stand elements, which is formed of an upright leg and horizontal upper support and lower foot tubes, with a dotted line indicating the relative position of the upright leg tube on the other stand element.

FIG. 5 is a perspective view showing the keyboard stand in its folded position.

FIG. 6 is a perspective view, to an enlarged scale, showing the two-part brace.

FIG. 7 is an enlarged, fragmentary view, showing the connection between one end of a leg tube and one of either the support or foot tubes.

FIG. 8 shows a modified form of resilient sleeve.

DETAILED DESCRIPTION

As shown in FIG. 1, the stand 10 is for the purpose of supporting an electronic keyboard instrument 11. A typical keyboard is generally in the shape of a flat, long, narrow, low box 12 having a row of exposed keys 13, which are schematically shown. The actual dimensions of the box and the number and types of keys may vary. By way of example, a typical keyboard may run about 34 inches in length, about 15 inches in depth and a few inches in overall height.

The stand 10 is formed of a pair of stand units 15 and 16, each made of tubular metal material. The units each include elongated, upright legs 17 and 18 which are pivotally connected together at their middles by a suitable pivot 19, such as a rivot or the like. Thus, the legs form an X-shape which are arranged upright in roughly a vertical plane.

Upper support tubes 20 and 21 are secured to the upper ends of the upright legs 17 and 18 respectively. Likewise, longer, lower foot or floor engaging tubes 22 and 23 are secured to the lower ends of the upright legs 15 and 16. The support tubes and foot tubes are preferably arranged axially parallel with each other and perpendicular to the rough plane of the X-shape formed by the crossing legs 17 and 18.

As seen in FIG. 4, the upper support tube and the lower foot tube of the stand units are longitudinally off-set, relative to the upright leg of the unit. Thus, the upper support tube 20 is illustrated as having a forward portion 25 which is considerably longer than the rear extending portion 26. For example, the forward portion may be about twice as long as the rear portion. Likewise, the forward portion 28 of the longer, lower foot tube 22 is considerably longer than, for exaple, about twice the length of, the rear portion 29 of the foot tube.

Although the dimensions may be varied, as an example of the size of the legs and upper and lower tubes shown in FIG. 4, the upright legs may be about 35 inches in height, plus about an inch for connection purposes. The support may be about 12 inches in length, and the foot tube may be about 17½ inches in length. The upper support tube extends about 4 inches rearwardly of the center line of the leg to which it is attached and about 8 inches forwardly of that central line. Similarly, the lower foot tube extends rearwardly about 6¾ inches from the center line of its connected leg and about 10¾ inches forwardly of the center line of its leg.

Since the upright legs 15 and 16 cross each other for pivoting, the upright leg 16 of the second stand unit 16 is arranged forwardly slightly, as indicated by the dotted line in FIG. 4. The tubing may be on the order of about ¾ inch outside diameter so that the leg 16 is off-set a little more than ¾ inch relative to the leg 17 which is shown in solid lines in FIG. 4.

The upper and lower end portions 30 (see FIG. 7) of the upright legs 17 and 18 are flattened, as for example, by swaging. These flattened ends are arranged to fit into slots 31 formed in the tubes at the location of the connections between the tubes. Then, the inserted end portions, and the tube areas defining the slots may be fastened together as by welding or the like.

An adjustable length brace 35 interconnects the two upright legs 17 and 18. The brace comprises a first strip 36 which has a headed pin 37 mounted on one end and a pivot hole 38 formed in its opposite end. A suitable pivot, such as a rivet 39, extends through the hole 38 and into a corresponding hole formed in its adjacent upright leg. Similarly, a second strip 40 is provided with aligned bayonet type slots 41 along one end portion and a pivot hole 42 on its opposite end. A pivot, such as a rivet 43, extends through the hole 42 for securing the second strip to its adjacent leg.

The two strips are partially overlapped so that the headed pin on the first strip may be inserted into one of the slots in the second strip for adjustment of the length of the brace. Preferably, three slots are utilized to correspond to a sitting position in a regular chair, a standing position and a partially seated position such as on a stool.

The opposite ends of the horizontal support and foot tubes are covered with thin, plastic end caps 45 for finishing the rough edges which result from cutting the tubes to length from tube stock during manufacturing.

Then, each of the forward and rear portions of the upper support tubes are covered with a long sleeve 46 and a short sleeve 47, respectively. The sleeves are made of a resilient, foam plastic material which can resiliently support the keyboard. The surfaces of the sleeves are sufficiently rough so as to frictionally engage and hold the keyboard against unwanted movement. The sleeves are provided with central bores 48 so that they may be slipped over and snugly engage their respective tube portions.

The opposite ends of the forward and rear support tube portions are provided with end collars 50. These collars, which are provided with a central bore 51 for slipping over the tube portions, may also be formed of a resilient, foam plastic material of a greater diameter than the sleeves so that they extend upwardly more than the upper surface of the sleeve. Thus, the collars act as resilient, side restraints for frictionally engaging the adjacent edge portions of the keyboard.

FIG. 8 illustrates a modified sleeve 53 whose upper surface is provided with a flat surface 54 for engaging the keyboard over a wider surface area before compressing. Collars similar to that described above are used with this sleeve.

The sleeves and collars may be formed as integral parts, in which case the sleeve portions may either be circular in cross section or flattened on the top as illustrated. However, preferably the sleeve and collar parts are made as separate elements so that they may be more easily made and assembled upon the tubes.

As illustrated in FIG. 5, the stand may be folded for storage purposes by removing the keyboard, disengaging the brace pin from the particular slot in which it is inserted, and then manually moving the upright legs into close proximity. For use, the reverse procedure is followed to reassemble the stand units in position for holding the keyboard.

This invention may be further developed within the scope of the following claims. Accordingly, the foregoing specification should be read as merely descriptive of an operative embodiment of this invention.

Having fully described an operative embodiment of this invention, I now claim:

1. A foldable keyboard stand for supporting a keyboard at different heights for use in sitting and standing positions, comprising:

a pair of elongated, leg tubes pivotally connected together at their middles and normally arranged in an upright position in an X-shape located in a roughly vertical plane for providing a forward user position side and a rear side on the opposite sides of the plane;

a horizontally arranged, elongated, upper, keyboard support tube secured to the upper ends of each leg tube, and a horizontally arranged, elongated, lower, foot tube secured to the lower ends of each foot tube;

the support tubes and the foot tubes all being substantially straight and parallel to each other and generally perpendicular to said plane with the opposite ends of the leg tubes being secured to the support tubes and the foot tubes by forming substantially flat end portions on the opposite ends of the leg tubes and providing correspondingly sized slots in the support tubes and the foot tubes for receiving said flat end portions, and fastening the flat end portions within the slots;

and the centers of the respective support tubes and foot tubes being laterally offset relative to the locations at which they are secured to the leg tubes so that the portions of the support tubes and leg tubes that extend forwardly, that is, towards said user position side, are roughly about twice the length of the portions that extend rearwardly;

a generally horizontally arranged, manually adjustable length brace interconnecting the legs at a point located at a distance from their pivot point about midway between said pivot point and the upper ends of each foot tube, said brace being formed of two, horizontally aligned, narrow, flat strips each having one of its pins pivotally connected to a leg tube and its opposite, free end extending toward and being overlapped by the corresponding free end of the other strip and one of said strips having a pin formed on its free end and the other of said strips having aligned, pin-receiving openings formed along its length for selectively receiving the pin in one of such openings for thereby adjusting the length of the brace by inserting and removing the pin from one opening to a preselected opening so that the angularity of the legs can be adjusted for raising or lowering the height of the support tubes whereby they may support a keyboard at a predetermined higher location for use in a standing position or at a predetermined lower location for use in a sitting position;

and a resilient, relatively rough surfaced sleeve, made of a resilient, foam plastic material for resiliently compressing under the pressure of the keyboard and having a relatively high frictional surfaces for frictionally holding the keyboard against movement, and having a support tube receiving bore, positioned upon each of the forward and rear portions of the support tube for substantially covering the lengths thereof;

and a resilient, foam plastic material, short length collar having a central support tube receiving bore, positioned upon the opposite end portions of the support tubes in endwise, axial alignment with their respective adjacent sleeves, with the collars being substantially higher than the upper surfaces of the sleeves, so that a keyboard may be rested upon the sleeves and held between the collars to restrain the keyboard against undesired movement relative to the support tubes.

2. A keyboard stand as defined in claim 1, and including the lower foot tubes being longer than the upper support tubes, with the foot tube portions extending forwardly and rearwardly a greater distance than the respective support tube forward and rear extending portions.

3. A keyboard stand as defined in claim 1, and with the upper surfaces of the sleeves being flattened and normally arranged generally horizontally for engagement with the lower surface of the keyboard.

* * * * *